(12) United States Patent
Bradley

(10) Patent No.: US 8,333,886 B2
(45) Date of Patent: Dec. 18, 2012

(54) WASTEWATER TREATMENT APPARATUS

(75) Inventor: James Bradley, Ladoga, IN (US)

(73) Assignee: Aqua Manna, LLC, Ladoga, IN (US)

( * ) Notice: Subject to any disclaimer, the term of this patent is extended or adjusted under 35 U.S.C. 154(b) by 0 days.

(21) Appl. No.: 13/031,374

(22) Filed: Feb. 21, 2011

(65) Prior Publication Data

US 2011/0215057 A1 Sep. 8, 2011

Related U.S. Application Data

(63) Continuation of application No. PCT/US2009/054522, filed on Aug. 20, 2009.

(60) Provisional application No. 61/090,396, filed on Aug. 20, 2008.

(51) Int. Cl.
*B01D 33/70* (2006.01)

(52) U.S. Cl. ........ 210/150; 210/151; 210/197; 210/220; 210/242.2

(58) Field of Classification Search .......... 210/150–151, 210/629, 197, 220, 242.2
See application file for complete search history.

(56) References Cited

U.S. PATENT DOCUMENTS

| | | | |
|---|---|---|---|
| 5,565,096 A * | 10/1996 | Phelan | 210/150 |
| 7,329,351 B2 * | 2/2008 | Roberts et al. | 210/620 |
| 2006/0008865 A1 * | 1/2006 | Cote et al. | 435/34 |

* cited by examiner

*Primary Examiner* — Chester Barry
(74) *Attorney, Agent, or Firm* — Ice Miller LLP

(57) ABSTRACT

A water treatment unit includes a mixing chamber surrounding the upper end of a riser containing an impeller. Water can be moved from a body of water up through the riser, and out through laterally directed openings into the chamber adjacent to an air inlet. The water moving out the laterally directed openings of the stand pipe, mixes with air drawn in through the air inlet to oxygenate the water, and the oxygenated water exits the chamber into the body of water through one or more water outlets in the lower portion of the chamber due to the head developed by the inflow of water into the chamber. The outward flow of water from the chamber can cause a toroidal or other desired flow of water within the body of water surrounding the water treatment apparatus.

20 Claims, 5 Drawing Sheets

WASTEWATER TREATMENT APPARATUS

CROSS-REFERENCE TO RELATED APPLICATIONS

This application is a continuation of Patent Cooperation Treaty Patent Application Ser. No. PCT/US09/054522, filed Aug. 20, 2009, which claims priority to U.S. Provisional Patent Application Ser. No. 61/090,396 filed Aug. 20, 2008. The entire disclosure of each of the foregoing applications is incorporated herein by reference.

BACKGROUND

Wastewater from municipal sewage systems, large-scale agricultural operations, and industrial waste product systems often includes large amounts of organic and inorganic waste material that, if left untreated, can create severe odors due to anaerobic decay and can generate toxic products. Treating such waste generally involves collecting the organic and inorganic waste material in a stream of liquid or water, and collecting the waste in settling pools, ponds, or lagoons. Thereafter, the waste is allowed to settle in progressive settling ponds, pools, or lagoons, and any floating detritus is allowed to decompose, allowing the effluent to be run off relatively free of the debris for further treatment or clarification. During this process, the addition of oxygen sufficient to meet the basic oxygen demand (BOD) is preferred so that the waste material in the water will undergo biodegradation that converts the wastewater into a relatively nontoxic, non-offensive effluent. Since anaerobic decomposition is inefficient as compared to aerobic decomposition, and anaerobic decomposition often results in the production of a malodorous sulfur-containing gas, it is preferred to add oxygen to the wastewater to increase decomposition while reducing or eliminating the existence of anaerobic decomposition. Various approaches have been used, typically by surface aeration or by submerged aeration systems wherein air is pumped below the surface of the water, or sometimes by a rotating impeller that mixes the wastewater and entrains air into that water. Examples are to be found in U.S. Pat. Nos. 3,521,864; 3,846,516; 5,874,003; 6,145,815; and 6,241,221.

While each of these previous designs may have application in that have been considered and developed, there is still a need for an improved apparatus for economically mixing a large quantity of wastewater with sufficient air to at least satisfy the BOD of the wastewater to promote biodegradation of the waste materials, and/or to reduce or eliminate offgassing of offensive odors. Further, it will be appreciated that in the collection of sewage from household waste, a great deal of human hair accumulates in settling pools, ponds, or lagoons, causing large mats or strings of hair mixed with other organic matter, which will often cause entanglement of material in wastewater treatment equipment, and can result in equipment failure—an issue that is not addressed in the foregoing prior examples. As such, a design that is not adversely affected by the hair and stringy waste that accumulates in wastewater facilities, while providing oxygenation of a large variety of settling pools, ponds, or lagoons in an energy efficient manner and producible at a cost effective price would be greatly appreciated.

SUMMARY

These needs may be satisfied by a water treatment unit that can be situated in a body of water such as a tank, pool, pond or lake. The water treatment unit includes a riser having an intake that can be situated below the surface of the water. A chamber is coupled to an upper portion of the riser stand that has a base, a sidewall extending upward from the base, and a top that can be located above the water surface in the body of water. The riser has an outlet adjacent the top of the riser into the chamber. The chamber has at least one water outlet in a lower portion of the chamber, and an air inlet in an upper portion of the chamber. The water outlet from the chamber can take the form of one or more outlets through the chamber base. A directionally adjustable pipe can be coupled to the outlet from the chamber so that the outflow from the chamber can be used to develop a desired flow pattern, such as a toroidal flow, within the body of water.

An impeller is connected to the riser to move water upward from the intake and out through the upper opening of the riser into the chamber. The upper opening can take the form of a plurality of openings spaced around an upper portion of the riser. The impeller can take the form of a motor coupled to the chamber. upper portion immediately above an upper end of the riser and a shaft coupled to the motor and to at least one propeller situated within the riser below the water level in the body of water. The water flow from the riser into the chamber creates a head within the chamber forcing water out through the water outlet in the lower portion of the chamber.

The water treatment unit riser upper opening can be surrounded by a depending flange. The depending flange can intercept and outward flow of water from the upper opening of the riser. The outward flow of water will also become downwardly directed at least due to the influence of gravity. The outward and downwardly directed flow of water can entrain air coming through the air inlet in the upper portion of the chamber to elevate the level of oxygen dissolved in the water within the chamber, which then flows out through the outlets in the chamber base. The downwardly directed water can also mix with water in the chamber in a turbulent manner to generate a surface foam.

The water treatment unit can be used to move water from the body of water up through the riser, and out through the laterally directed openings into the chamber adjacent to the air inlet. The water moving out the laterally directed openings of the stand pipe, mixes with air drawn in through the air inlet to oxygenate the water, and the oxygenated water exits the chamber into the body of water through one or more water outlets in the lower portion of the chamber due to the head developed by the inflow of water into the chamber. The outward flow of water from the chamber can cause a toroidal or other desired flow of water within the body of water surrounding the water treatment apparatus.

Other features of the present disclosure and the corresponding advantages of those features will become apparent from the following discussion of the preferred embodiments of the present disclosure, exemplifying the best mode of practicing the present disclosure, which is illustrated in the accompanying drawings. The components in the figures are not necessarily to scale, emphasis instead being placed upon illustrating the principles of the disclosure. Moreover, in the figures, like referenced numerals designate corresponding parts throughout the different views, but not all reference numerals are shown in each of the figures.

DESCRIPTION

Figure 1:
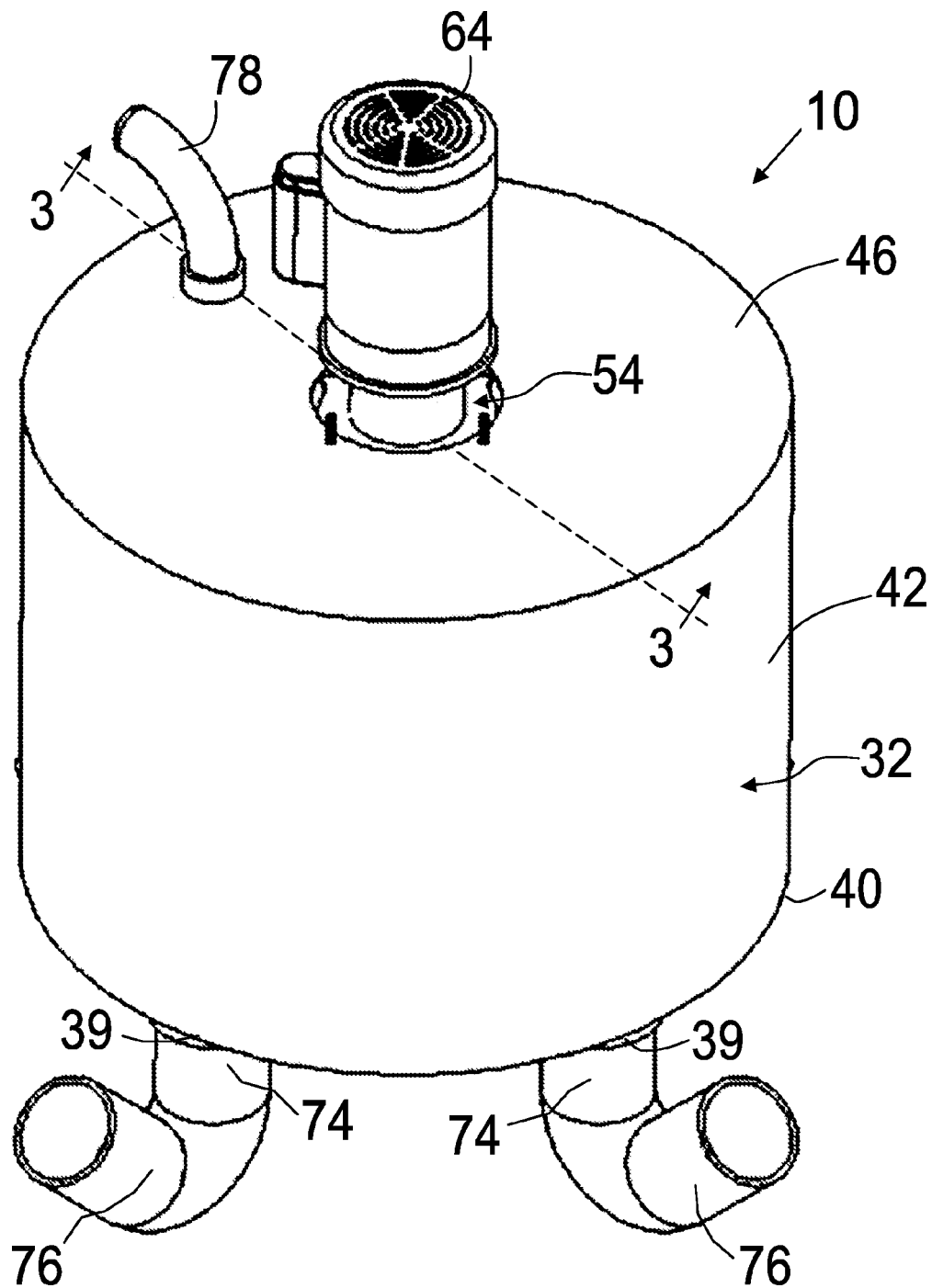
FIG. 1 is a perspective view of a water treatment unit embodying the present disclosure.
Figure 2:
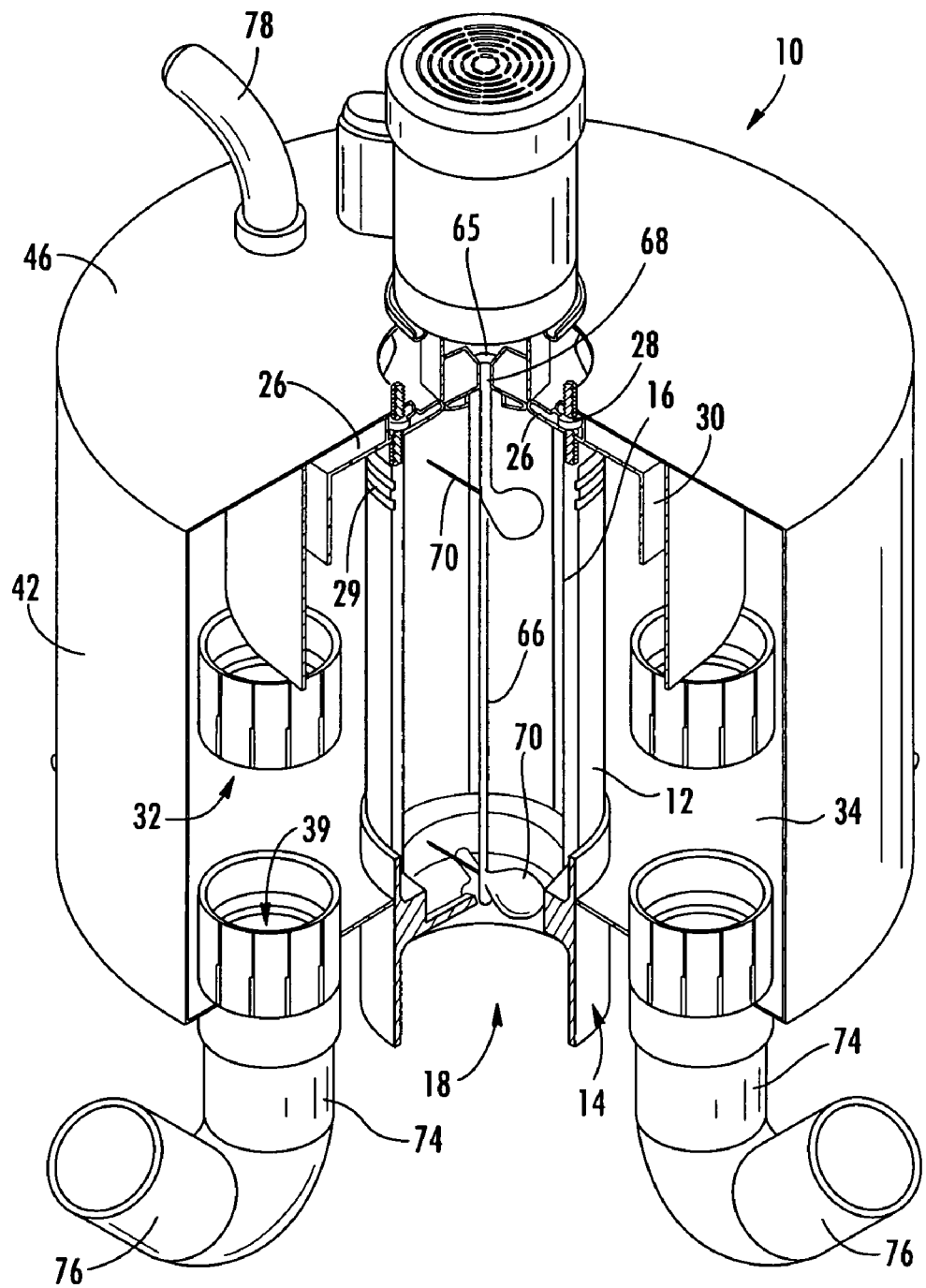
FIG. 2 is a perspective view of a water treatment unit according to the present application with a portion broken away to reveal the interior the water treatment unit.
Figure 3:
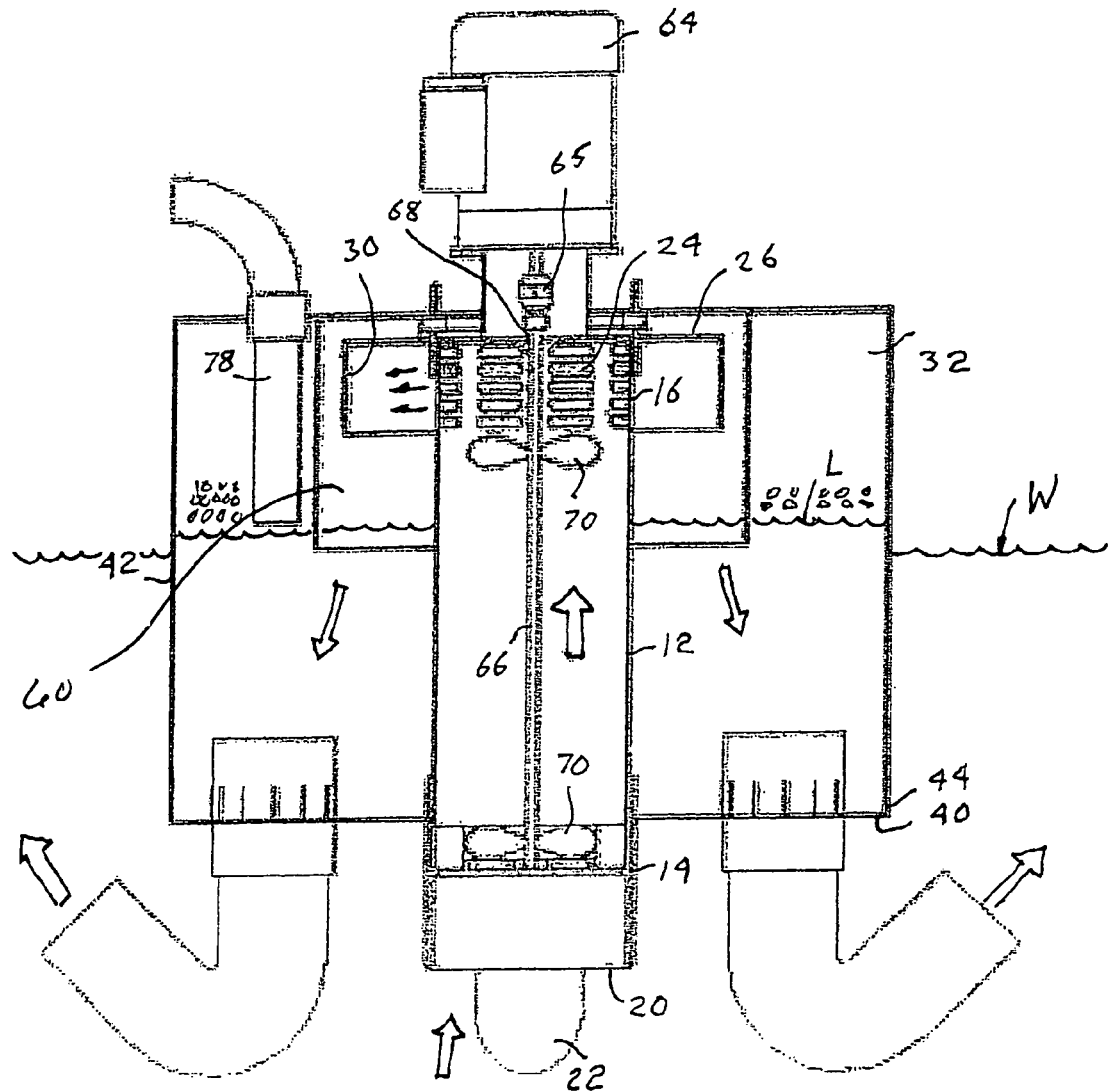
FIG. 3 is a sectional view of the water treatment unit shown in FIG. 1 taken along line 3-3.

Turning now to FIGS. 1 and 2, according to at least one embodiment of the present application, a water treatment unit 10 includes a riser or pump barrel 12 having a lower end 14 and an upper end 16 that is optionally fabricated from plastic, metal (including, for example, galvanized steel, enamel-coated steel, aluminum, stainless steel, or other malleable metals), or other materials known in the art. Further, according to at least one embodiment, one or more inlets 18 are be provided around lower end 14 of riser 12. According to at least one optional embodiment, a bottom end 20 is optionally added to lower end 14 of riser 12, whereby one or more inlets 18 may be fitted to lower end 14 of riser 12, and may optionally include a ballast member 22 as shown in FIG. 3 to assist in maintaining the water treatment unit 10 upright. It will be appreciated that the weight of ballast member 22 may be adjusted to adjust the height at which the upper end 16 floats above the water level of the lagoon, pond, or tank W.

According to at least one embodiment, riser 12 is sized and shaped to be of any required length and cross-sectional area as required by the necessary water flow, amperage requirements, and viscosity of wastewater. One or more water discharge outlets 24 can be provided around the upper end 16 of the riser 12. A cap 26 can be coupled to the upper end 16 of the riser 12 by fasteners 28 or other means to substantially close the upper end 16 of the riser 12. The cap 26 can include a peripheral wall 30 that surrounds the upper end 16 of the riser 12.

A mixed wastewater chamber 32 optionally surrounds the upper end 16 of the riser 12 and peripheral wall 30, formed by a housing comprising a chamber floor 34 that is optionally fixed to a selected portion of riser 12, located between the upper end 16 and the lower end 14, by fasteners, welding, fusing or other means of connecting the material comprising riser 12 and chamber floor 34. Mixed wastewater chamber 32 further optionally comprises wall 42 and chamber ceiling 46, with chamber floor 34, wall 42, and chamber ceiling 46 meeting to cause wastewater chamber 32 to attach to, and substantially enclose riser 12. Chamber floor 34 optionally comprises one or more openings 39 in chamber floor 34, whereby fluid that has been pumped through riser 12 cascades out through discharge outlets 24, into mixed water chamber 32, and building pressure forces the resulting mixed fluid down and out through the one or more openings 39 in chamber floor 34. Further optionally, chamber ceiling 46 comprises chamber ceiling opening 54 through which air can be drawn into the chamber 32. An intermediate wall 58 optionally depends from chamber ceiling 46 outside peripheral wall 30 (if present in the embodiment) and inside the outer wall 42. In operation, turning to FIG. 3, intermediate wall 58 separates an inner chamber 60 from the remainder of chamber 32, as intermediate wall 58 is sized to depend from chamber ceiling 46 to reach water level W1 inside chamber 32 such that no air gap exists between water level W1 and a bottom portion of inner intermediate wall 58. While each of the peripheral wall 30, intermediate wall 58 and chamber wall 42 are illustrated to be portions of right cylinders in shape in FIGS. 1, 2, and 3, other shapes may be adopted for one or more of the walls 30, 42 and 58.

Figure 4:
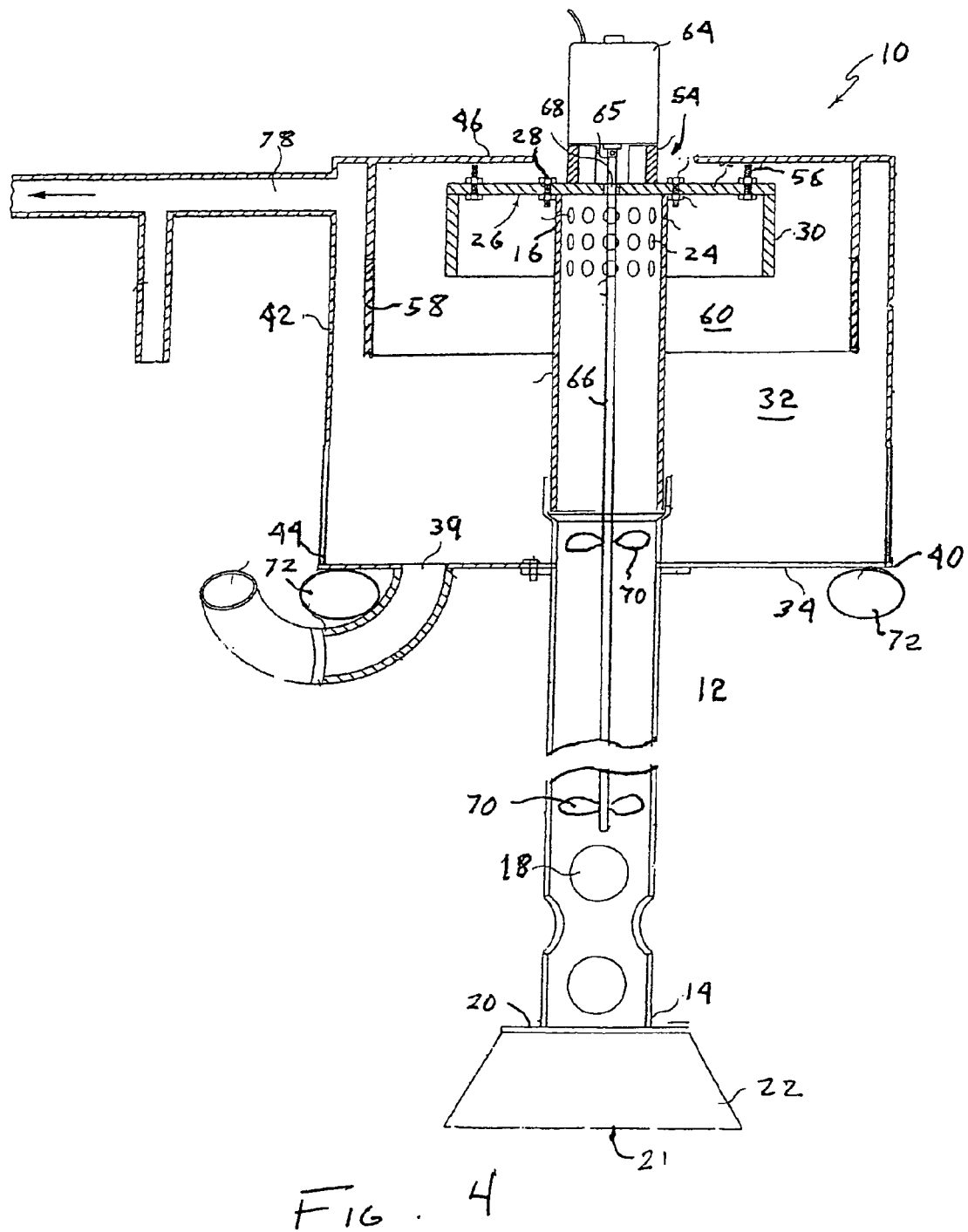
FIG. 4 is a view similar to FIG. 3 of a second water treatment unit embodying the present disclosure.
Figure 5:
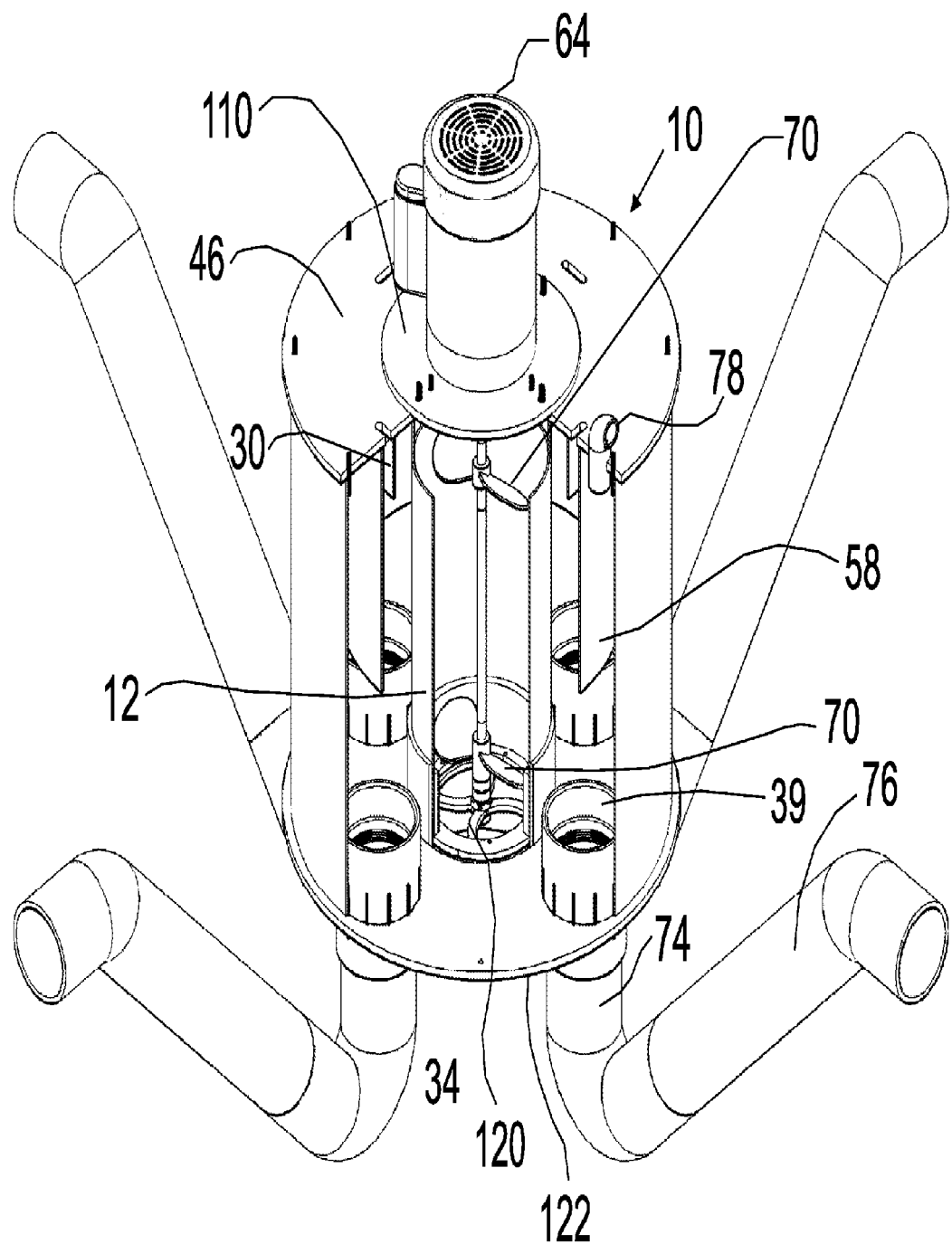
FIG. 5 is a perspective view of a water treatment unit according to the present application, having a portion broken away to reveal the interior the water treatment unit.

According to at least one embodiment, motor 64, such as a ¾ HP electric motor or any other properly sized and powered motor, engine, or other revolving powerplant, can be fixed to and supported by the cap 26 as shown in FIGS. 2-4, or motor 64 may be attached to a motor plate 110 that is sized larger than chamber ceiling opening 54, thereby allowing motor 64, and motor plate 110 (shown in FIG. 5) may be removably attached to chamber ceiling 64 by way of fasteners such as bolts, wing nuts, or other fastener means. Shaft 66 is optionally connected to motor 64 by coupling member 65 extending downward through cap opening 68 in cap 26 in general axial alignment with riser 12. It will be appreciated that by utilizing a motor plate that fits over the top of chamber ceiling opening as shown in FIG. 5, removal of the motor 64, shaft 66, and propellers 70 are readily pulled from riser 12 to allow for inspection of components, sharpening of blades, and general maintenance or repair of the equipment with minimal disassembly effort.

According to at least one embodiment, at least one propeller 70 is coupled to shaft 66 to cause rotation of shaft 66 by the motor 64, thereby creating an upward flow of fluid from a body of water outside waste treatment unit 10 into riser 12. A buoyant member 72, such as that shown in FIG. 4, may be attached to waste treatment unit 10 in any manner to cause waste treatment unit to sit at a specified height in a body of water or fluid such that waste treatment unit 10 sits at a predetermined level W as shown in FIG. 3. It will be appreciated that level W may be determined as a different height for different embodiments of waste treatment unit 10, and depending on the application for which waste treatment unit 10 is utilized. It will be appreciated that buoyant member 72 can take many forms, including foam filled buoys, air filled bladders that may be adjusted to adjust where water level W sits in relation to waste treatment unit 10, or any other buoyant material. For example, two buoyant floats such as two 2'×4' polyethylene coated foam dock floats available from Formex Manufacturing, Inc., Lawrenceville, Ga., can be utilized, along with cross members or other attaching members to hold waste treatment unit 10 in the proper relation to the fluid line. Additionally, two or more torque lines can be connected to the outer wall 42 to prevent rotation of the treatment unit 10 when the motor 64 is running.

As shown in FIG. 3, according to at least one embodiment, multiple propellers 70 are employed, whereby a first propeller 70 is included along shaft 66 near the lower end of riser 12, and a second propeller 70 is included along shaft 66 near upper end 16 of riser 12. In at least one exemplary embodiment, second propeller 70 is positioned such that the propeller is at least partially exposed to air, thereby allowing second propeller to entrain air into the water or fluid flowing past second propeller 70 and into discharge outlets 24. According to at least one embodiment, second propeller is positioned relative to the height of the discharge outlets such that air is entrained into the water at a size less than 1.0 mm, 0.5 mm, less than 0.25 mm, less than 0.15 mm, or less than 0.1 mm in size for the given motor/propeller combination.

An alternate embodiment is shown in FIG. 4 in which the water treatment unit 10 is shown to include a riser or pump barrel 12 having a lower end 14 and an upper end 16. One or more inlets 18 can be provided around the lower end 14 of the riser 12. A bottom end 20 can be provided that may include a ballast member 22 to assist in maintaining the water treatment unit 10 upright. The riser 12 can be of any required length. One or more water discharge outlets 24 can be provided around the upper end 16 of the riser 12. A cap or lid 26 can be coupled to the upper end 16 of the riser 12 by fasteners 28 or other means to substantially close the upper end 16 of the riser 12. The cap 26 can include a depending wall peripheral wall 30 that surrounds the upper end 16 of the riser 12.

A chamber 32 can surround the upper end 16 of the riser 12 and the peripheral wall 30. A chamber floor or bottom plate 34 can be fixed to an intermediate portion 36 of the riser 12, located between the upper end 16 and the lower end 14, by fasteners 38 or other means. The chamber floor or bottom plate 34 can have one or more openings 39 and an outer edge 40 that can be circular. The chamber 32 can be further defined by a shroud outer wall 42 that can have a lower edge 44 that contacts the chamber floor or bottom plate 34. A chamber ceiling 46 can have an outer edge 48 that can be fixed to or unitary with an upper edge 50 of the shroud outer wall 42. The chamber ceiling 46 optionally includes chamber ceiling opening 54 through which air can be drawn into chamber 32. The top wall 46 can be spaced from the cap 26 by means of spacers 56, which can be adjustable. The spacers 56 are illustrated to be fixed to the cap 26 and contacting top wall 46, but the spacers can be fixed to the top wall 46 and contacting cap 26. An intermediate wall 58 can depend from the top wall 46 outside the peripheral wall 30 and inside the outer wall 42. The intermediate wall 58 can be seen to separate an inner chamber 60 from an outer chamber 62. While each of the peripheral wall 30, intermediate wall 58 and outer wall 42 are illustrated to be portions of right cylinders in shape, other shapes may be adopted for one or more of the walls 30, 42 and 58.

A motor 64, such as a ¾ HP electric motor, can be fixed to and supported by the cap 26. A shaft 66 can be coupled to the motor 64 by coupling member 65 to extend downward through an opening 68 in cap 26 in general axial alignment with the riser 12. At least one propeller 70 can be coupled to the shaft 66 so that rotation of the shaft 66 by the motor 64 can cause an upward flow of water within the riser 12. A buoyant member 72 can be coupled to the chamber floor 34 or to outer wall 42 to maintain the top wall 46 above the surface of the water surrounding the water treatment unit 10, particularly in high water situations. In low water situations, the water treatment unit 10 may rest on the bottom 21 of the ballast unit 22. Two or more torque lines 41 can be connected to the outer wall 42 to prevent rotation of waste treatment unit 10 when the motor 64 is running.

The operation of the water treatment unit 10 is illustrated, particularly in FIG. 3. As shown in at least one exemplary embodiment, waste treatment unit 10 is be placed in a body of water W such that riser 12 extends downward to a desired depth. It will be appreciated that the lower portion 14 of riser 12 may be made of a material that allows the addition of segmented tubes or other structures, such as PVC piping, stainless steel piping with threaded extensions, or other such structures that allows the ultimate depth of riser 12 to be determined by a user such that stratified layers of water in a treatment lagoon can be specifically targeted to be drawn up through riser 12 for oxygenation and displacement, thereby allowing water in the lower, anaerobic areas of a lagoon to be drawn up, oxygenated, and discharged. It will be appreciated that when motor 64 is powered on, water or the fluid in the lagoon, pond, or tank is drawn into the riser 12 through inlets 18 and propelled upward through the riser 12 by one or more propellers 70. exits the riser 12 through outlets 24 into chamber 32. The continuous flow of fluid into the chamber 32 generally causes the fluid surface level L within the chamber 32 to be slightly higher than the water surface surrounding the chamber, thus providing a hydraulic pressure forcing the water out the openings 39 in the chamber floor 34. The size of the riser 12, motor 64, and propellers 70 are desirably selected so that between about 600 to 1000 gallons of water per minute can be pumped up though the riser 12 into the chamber 32. Furthermore, fluid surface level L within chamber 32 may be manipulated by a user such that the pressure therein is increased, thereby allowing greater amounts of oxygen to be transferred. For example, the surface level L may be manipulated to increase sufficient to create a hydraulic pressure equal to approximately at least 1.1 atmospheres, at least 1.2 atmospheres, at least 1.3 atmospheres, or at least 1.4 atmospheres hydraulic pressure, thereby entraining more oxygen therein.

This flow of fluid through riser 12 causes a continuous air inflow into the upper end 16 of riser 12 though chamber ceiling opening 54, the air being mixed with the fluid within riser 12 at the point of discharge of the fluid from riser 12 through discharge outlets 24. As fluid cascades out of discharge outlets 24, into inner chamber 60, out into chamber, chamber 32 and forcefully exits openings 39, the direction and depth at which the oxygenated fluid is discharged can be determined the optional use of flow direction pipes 74 and 76, which may be adjustable with respect to each other to selectively determine the depth and direction of flow direction pipes 74 and 76. By selective direction of pipes 74 and 76, the fluid outflow from waste treatment unit 10 can at least partially oppose or offset the rotation of the treatment unit 10 due to the torque provided when the motor 64 is running. The flow of water within the chamber 32 may cause the development of foam on the surface of the water within chamber 32, depending on the fluid conditions. According to at least one exemplary embodiment, accumulating foam can be vacuum withdrawn through pipe 78, or in another embodiment, the foam will automatically eject through pipe 78 due pressure build-up. Additionally, it will be appreciated that an activated charcoal filter may be added to pipe 78 to reduce any odor produced from the treated water as gas is offgased.

Turning now to FIG. 5, according to yet another exemplary embodiment, waste treatment unit 10 optionally includes a movable shearing blade 120 attached to shaft 66, and a fixed shearing blade 122. Both fixed shearing blade 122 and movable shearing blade 120 may comprise metal, including steel, stainless steel, hardened steel, hardened stainless steel, or ceramic, carbide, or other suitable material. In practice, movable shearing blade 120 may be urged into close planar contact with fixed shearing blade 122 through the use of a bushing 124, whereby the bushing comprises a spring, rubber, or other material able to urge shearing blade 120 toward fixed shearing blade 122. By urging movable shearing blade 120 toward fixed shearing blade 122, when motor turns shaft 66, movable shearing blade rotates, and when passing over the top of fixed shearing blade 122, any material caught between movable shearing blade 120 and fixed shearing blade 122 is sliced, thereby reducing the likelihood of long, stringy waste from becoming entangled with propeller 70 or clogging discharge outlets 24. Further, bushing 124 allows a slight upward movement of the blade in relation to fixed shearing blade, any hardened or uncuttable objects may pass between the two blades, thereby preventing seizure of the unit and potential damage to motor 64.

In application, at least one embodiment an oxygen transfer rate of at least 0.50 kg/hr $O_2$ transfer can be achieved while utilizing approximately 4.5 to 5 amps of electricity at 120 volts. In at least one additional embodiment, an oxygen transfer rate of at least 0.8 kg/hr $O_2$ transfer can be achieved while utilizing approximately 4.5 to 5 amps of electricity at 120 volts.

Turning now to FIG. 4, it will be appreciated that additional flow direction pipes 74 and 76 may be added to inlets 18, thereby allowing a user to further control to the source of water collection, and further allowing selective uptake of water at points in the lagoon where the oxygen level is likely to be the lowest. Likewise, by selectively placing flow direction pipes 74 and 76 to intake at points in a lagoon that are most likely to have low oxygen levels (both in terms of height and position within the lagoon), and by selectively placing flow direction pipes 74 and 76 for dispelling oxygenated water from the waste treatment unit 10, a more consistently oxygenated lagoon can be developed by developing both inward and outward flow currents that adequately disperse oxygenated water and intake low oxygenated water, thereby allowing permeation of oxygen throughout the lagoon without creating a turbulent flow of water that precludes the settling of organic matter that is required in clarification or settling tanks or lagoons. Further, due to the fact that flow can be directed with relative precision and with relatively low pressure, a reduced amperage is required to operate motor 64, thereby resulting in increased energy efficiency. Finally, it will be appreciated that the use of such directional flow allowing slower water transfer to occur further allows the use of propeller speeds to entrain air while not dispersing bacterial colonies known as flock.

Additionally, it will be appreciated that utilizing the flow direction pipes 74 and 76, water may be utilized to direct water brought up from warmer strata in the winter to help eliminate ice build-up on the surface of outdoor lagoons, which further allows for additional oxygenation of the lagoon.

While these features have been disclosed in connection with the illustrated preferred embodiment, other embodiments of the disclosure will be apparent to those skilled in the art that come within the spirit of the disclosure as defined in the following claims. Further, it will be appreciated that in very large ponds or lakes, it may be convenient or necessary to employ two or more water treatment units 10 to ensure a total water flow volume sufficient to provide sufficient oxygen to satisfy the BOD of the body of water.

What is claimed is:

1. A water treatment unit for treating water, the water treatment unit comprising:

a generally vertical riser having a lower end and an upper end, at least one inlet opening adjacent the lower end, and at least one outlet opening adjacent the upper end;

a chamber surrounding the riser upper end the chamber having a base, a sidewall extending upward from the base, and a top, the chamber having at least one water outlet in a lower portion of the chamber, and an air inlet in an upper portion of the chamber;

a motor coupled to the chamber top, a shaft coupled to the motor extending downward from the motor in general axial alignment within the riser, and at least one propeller coupled to the shaft to move water up the riser into the chamber, operable to mix the water with air flowing inward through the air inlet, the mixed air and water creating a head within the chamber forcing water out through the water outlet; and a directionally adjustable pipe coupled to the at least one water outlet from the chamber.

2. The water treatment unit of claim 1, further comprising a fixed shear blade within the riser in planar contact with a movable shear blade coupled to the shaft, the movable shear blade operable to cut organic matter moving between the fixed shear blade and the movable shear blade.

3. The water treatment unit of claim 1, wherein the head within the chamber creates an absolute pressure within the water treatment unit of at least 1.1 atmospheres.

4. The water treatment unit of claim 1, wherein at least one of the at least one propeller is placed within proximity of the air inlet in the upper portion of the chamber such that rotation of the propeller entrains air bubbles of 0.5 mm or less in diameter.

5. The water treatment unit of claim 1, further comprising at least one buoyant member operable to maintain the water treatment unit at a preselected level relative to a body of water in which it is placed.

6. The water treatment unit of claim 1, further comprising flow direction pipes attached to the inlet opening, operable to direct the height and direction of any water to be urged into the water treatment unit.

7. The water treatment unit of claim 1, further comprising an intermediate wall depending at least partially into the chamber from the chamber top.

8. A water treatment unit for treating water, further the water treatment unit comprising:

a generally vertical riser having a lower end and an upper end, at least one inlet opening adjacent the lower end, and at least one outlet opening adjacent the upper end;

a chamber surrounding the riser upper end the chamber having a base, a sidewall extending upward from the base, and a top, the chamber having at least one water outlet in a lower portion of the chamber, and an air inlet in an upper portion of the chamber;

a motor coupled to the chamber top, a shaft coupled to the motor extending downward from the motor in general axial alignment within the riser, and at least one propeller coupled to the shaft to move water up the riser into the chamber, operable to mix the water with air flowing inward through the air inlet, the mixed air and water creating a head within the chamber forcing water out through the water outlet; and an intermediate wall depending at least partially into the chamber from the chamber top, the intermediate wall dividing the chamber into an inner chamber and an outer chamber.

9. The water treatment unit of claim 8, further comprising flow direction pipes attached to each of the at least one water outlet, the flow direction pipes operable to direct the flow of water outward from the water treatment unit.

10. The water treatment unit of claim 8, further comprising a fixed shear blade within the riser in planar contact with a movable shear blade coupled to the shaft, the movable shear blade operable to cut organic matter moving between the fixed shear blade and the movable shear blade.

11. The water treatment unit of claim 8, wherein the head within the chamber creates an absolute pressure within the water treatment unit of at least 1.1 atmospheres.

12. The water treatment unit of claim 8, wherein at least one of the at least one propeller is placed within proximity of the air inlet in the upper portion of the chamber such that rotation of the propeller entrains air bubbles of 0.5 mm or less in diameter.

13. The water treatment unit of claim 8, further comprising at least one buoyant member operable to maintain the water treatment unit at a preselected level relative to a body of water in which it is placed.

14. The water treatment unit of claim 8, further comprising flow direction pipes attached to the inlet opening, operable to direct the height and direction of any water to be urged into the water treatment unit.

15. A water treatment unit for treating water, the treatment unit comprising:

a generally vertical riser having a lower end and an upper end, at least one inlet opening adjacent the lower end, and at least one outlet opening adjacent the upper end, a chamber surrounding the riser upper end the chamber having a base, a sidewall extending upward from the base, and a top, the chamber having at least one water outlet in a lower portion of the chamber, and an air inlet in an upper portion of the chamber, an intermediate wall depending into the chamber from the top wall, the intermediate wall dividing the chamber into an inner chamber and an outer chamber, a motor coupled to the chamber top, a shaft coupled to the motor extending downward from the motor in general axial alignment within the riser, and a plurality of propellers coupled to the shaft to move water up the riser into the chamber, operable to mix the water with air flowing inward through the air inlet, the mixed air and water creating a head within the chamber forcing water out through the water outlet, and a fixed shear blade within the riser in planar contact with a movable shear blade coupled to the shaft, the movable shear blade operable to cut organic matter moving between the fixed shear blade and the movable shear blade.

16. The water treatment unit of claim 15, further comprising a directionally adjustable pipe coupled to the at least one water outlet from the chamber.

17. The water treatment unit of claim 15, further comprising flow direction pipes attached to each of the at least one water outlet, the flow direction pipes operable to direct the flow of water outward from the water treatment unit.

18. The water treatment unit of claim 15, wherein at least one of the plurality of propellers is placed within proximity of the air inlet in the upper portion of the chamber such that rotation of the propeller entrains air bubbles of about 0.5 mm or less in diameter.

19. The water treatment unit of claim 15, further comprising at least one buoyant member operable to maintain the water treatment unit at a preselected level relative to a body of water in which it is placed.

20. The water treatment unit of claim 15, further comprising flow direction pipes attached to the inlet opening, operable to direct the height and direction of any water to be urged into the water treatment unit.

* * * * *